United States Patent
Laymon et al.

(10) Patent No.: US 11,938,997 B1
(45) Date of Patent: Mar. 26, 2024

(54) VEHICLE HAVING ELECTRIC DRIVE AND OPERATOR PLATFORM

(71) Applicant: Hydro-Gear Limited Partnership, Sullivan, IL (US)

(72) Inventors: Brian D. Laymon, Mattoon, IL (US); K. Mike McCoy, Avon, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 278 days.

(21) Appl. No.: 17/302,682

(22) Filed: May 10, 2021

Related U.S. Application Data

(60) Continuation of application No. 16/806,289, filed on Mar. 2, 2020, now Pat. No. 11,001,299, which is a continuation of application No. 16/213,744, filed on Dec. 7, 2018, now Pat. No. 10,577,019, which is a division of application No. 15/357,752, filed on Nov. 21, 2016, now Pat. No. 10,150,503, which is a division of application No. 14/693,255, filed on Apr. 22, 2015, now Pat. No. 9,499,199.

(60) Provisional application No. 61/983,357, filed on Apr. 23, 2014.

(51) Int. Cl.
| | |
|---|---|
| *B62D 11/04* | (2006.01) |
| *B60K 6/40* | (2007.10) |
| *B62D 11/00* | (2006.01) |
| *B62D 49/06* | (2006.01) |
| *A01D 34/64* | (2006.01) |
| *A01D 101/00* | (2006.01) |
| *B60K 6/46* | (2007.10) |

(52) U.S. Cl.
CPC ............... *B62D 11/04* (2013.01); *B60K 6/40* (2013.01); *B62D 49/0692* (2013.01); *A01D 34/64* (2013.01); *A01D 2101/00* (2013.01); *B60K 6/46* (2013.01); *B60Y 2200/223* (2013.01); *B62D 11/003* (2013.01); *Y02T 10/62* (2013.01); *Y10S 903/951* (2013.01)

(58) Field of Classification Search
CPC ..... B62D 11/04; B62D 11/001; B62D 11/003; B62D 11/02
See application file for complete search history.

(56) References Cited

U.S. PATENT DOCUMENTS

| | | | | |
|---|---|---|---|---|
| 3,616,869 | A | * | 11/1971 | Rilling ................... B60K 17/10 60/486 |
| 3,720,863 | A | | 3/1973 | Ringland et al. |
| 3,765,258 | A | | 10/1973 | Jespersen |

(Continued)

FOREIGN PATENT DOCUMENTS

| | | | | |
|---|---|---|---|---|
| EP | 1319577 A2 | * | 6/2003 | ........... B62D 11/003 |
| JP | 2022101177 A | * | 7/2022 | |

(Continued)

*Primary Examiner* — Kevin Hurley
(74) *Attorney, Agent, or Firm* — Neal, Gerber & Eisenberg LLP

(57) ABSTRACT

A zero turn vehicle is disclosed, having an operator platform located adjacent to the rear of the frame. An upright riser is disposed on the frame. The vehicle uses first and second electric drive transmissions to drive the output wheels. An electrical bus or controllers may be mounted on a panel of the upright riser or on the drive transmissions to assist in providing a compact design. A pair of drive levers is mounted on the upright riser for controlling the output of the vehicle.

13 Claims, 6 Drawing Sheets

(56) References Cited

U.S. PATENT DOCUMENTS

| | | | |
|---|---|---|---|
| 4,113,045 A | 9/1978 | Downing, Jr. | |
| 4,809,796 A | 3/1989 | Yamaoka et al. | |
| 5,078,222 A | 1/1992 | Hauser et al. | |
| 5,127,215 A | 7/1992 | Wenzel | |
| 5,224,562 A * | 7/1993 | Reed | A61H 3/04 |
| | | | 180/19.1 |
| 5,392,670 A | 2/1995 | Hauser | |
| 5,507,138 A | 4/1996 | Wright et al. | |
| 5,794,422 A | 8/1998 | Reimers et al. | |
| 5,809,755 A | 9/1998 | Velke et al. | |
| 5,984,031 A | 11/1999 | Velke et al. | |
| 6,082,084 A | 7/2000 | Reimers et al. | |
| 6,105,463 A | 8/2000 | Sporrer | |
| 6,125,630 A | 10/2000 | Abend et al. | |
| 6,152,247 A | 11/2000 | Sporrer et al. | |
| 6,155,033 A | 12/2000 | Wians et al. | |
| 6,449,934 B1 | 9/2002 | Reimers et al. | |
| 6,571,542 B1 | 6/2003 | Fillman et al. | |
| 6,575,055 B1 | 6/2003 | Sporrer | |
| 6,591,593 B1 | 7/2003 | Brandon et al. | |
| 6,604,348 B2 | 8/2003 | Hunt | |
| 6,644,004 B2 | 11/2003 | Reimers et al. | |
| 6,717,281 B1 | 4/2004 | Brandon et al. | |
| 6,729,114 B2 | 5/2004 | Fillman et al. | |
| 6,775,976 B1 | 8/2004 | Phanco et al. | |
| 6,856,035 B2 | 2/2005 | Brandon et al. | |
| 6,857,253 B2 | 2/2005 | Reimers et al. | |
| 6,912,831 B2 | 7/2005 | Velke et al. | |
| 6,938,400 B2 | 9/2005 | Fillman et al. | |
| 6,948,299 B2 | 9/2005 | Osborne | |
| 7,017,327 B2 | 3/2006 | Hunt et al. | |
| 7,134,276 B1 | 11/2006 | Langenfeld et al. | |
| 7,318,493 B2 | 1/2008 | Medina | |
| 7,328,762 B2 * | 2/2008 | Kanke | B62D 11/04 |
| | | | 200/332.2 |
| 7,392,869 B2 | 7/2008 | Carlson et al. | |
| 7,578,116 B1 | 8/2009 | Howell | |
| 7,610,975 B1 | 11/2009 | Gust et al. | |
| 7,644,524 B2 | 1/2010 | Azure et al. | |
| 7,677,344 B2 | 3/2010 | Medina et al. | |
| 7,721,517 B2 | 5/2010 | Hunt et al. | |
| 7,721,828 B2 * | 5/2010 | Fornes | B62D 11/04 |
| | | | 180/336 |
| 7,735,592 B2 | 6/2010 | Bellot et al. | |
| 7,841,044 B1 | 11/2010 | Weihl et al. | |
| 7,913,797 B1 * | 3/2011 | Mohns | A01D 42/00 |
| | | | 180/326 |
| 7,975,786 B2 | 7/2011 | Ishii et al. | |
| 8,056,653 B2 | 11/2011 | Hunt et al. | |
| 8,104,552 B2 | 1/2012 | Papke et al. | |
| 8,191,342 B2 | 6/2012 | Ishii et al. | |
| 8,275,502 B2 | 9/2012 | O'Connor et al. | |
| 8,544,570 B2 | 10/2013 | Ishii et al. | |
| 8,630,781 B2 | 1/2014 | O'Connor et al. | |
| 8,662,600 B2 | 3/2014 | Koga et al. | |
| 8,863,485 B2 | 10/2014 | Pitcel et al. | |
| 9,173,346 B2 | 11/2015 | Koike et al. | |
| 9,650,024 B2 * | 5/2017 | Weihl | B60T 7/042 |
| 9,866,088 B1 | 1/2018 | Hauser et al. | |
| 9,867,331 B1 * | 1/2018 | Siudyla | A01D 34/76 |
| 9,969,258 B1 | 5/2018 | Hauser | |
| 10,779,454 B2 * | 9/2020 | Papke | A01B 45/02 |
| 10,986,782 B2 * | 4/2021 | Fisher | A01D 69/03 |
| 11,130,409 B1 * | 9/2021 | Bonny | B60L 15/20 |
| 2001/0001170 A1 | 5/2001 | Velke et al. | |
| 2007/0137918 A1 | 6/2007 | Dong et al. | |
| 2007/0144167 A1 | 6/2007 | Abend et al. | |
| 2008/0234096 A1 | 9/2008 | Joshi et al. | |
| 2010/0126792 A1 | 5/2010 | Kallevig | |
| 2011/0046831 A1 | 2/2011 | Ananthakrishna | |
| 2011/0278088 A1 | 11/2011 | Weihl et al. | |
| 2012/0323420 A1 | 12/2012 | Koike et al. | |
| 2013/0015005 A1 | 1/2013 | Koga et al. | |
| 2013/0074464 A1 | 3/2013 | Gindt et al. | |
| 2014/0173946 A1 | 6/2014 | Gerrits et al. | |
| 2014/0259804 A1 | 9/2014 | Eavenson, Sr. et al. | |

FOREIGN PATENT DOCUMENTS

| | | |
|---|---|---|
| WO | 2006028978 | 3/2006 |
| WO | WO-2022023639 A1 * | 2/2022 |

\* cited by examiner

VEHICLE HAVING ELECTRIC DRIVE AND OPERATOR PLATFORM

CROSS-REFERENCE

This application is a continuation of U.S. application Ser. No. 16/806,289, filed on Mar. 2, 2020, which is a continuation of U.S. application Ser. No. 16/213,744, now U.S. Pat. No. 10,577,019, filed on Dec. 7, 2018, which is a division of U.S. application Ser. No. 15/357,752, now U.S. Pat. No. 10,150,503, filed on Nov. 21, 2016, which is a division of U.S. application Ser. No. 14/693,255, now U.S. Pat. No. 9,499,199, filed on Apr. 22, 2015, which claims the benefit of Provisional App. Ser. No. 61/983,357, filed on Apr. 23, 2014. The contents of these prior applications are incorporated herein by reference in their entirety.

BACKGROUND OF THE INVENTION

This invention relates to hybrid vehicles and, in particular, zero turn hybrid utility vehicles with ground engaging implements, such as mowing blades, brush cutters, and aerators.

SUMMARY OF THE INVENTION

Configurations of various zero turn hybrid vehicles are disclosed herein. A compact design of a stand-on vehicle using a pair of electrically driven wheels is disclosed.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

The description that follows describes, illustrates and exemplifies one or more particular embodiments of the present invention in accordance with its principles. This description is not provided to limit the invention to the embodiment or embodiments described herein, but rather to explain and teach the principles of the invention in such a way to enable one of ordinary skill in the art to understand these principles and, with that understanding, be able to apply them to practice not only the embodiment or embodiments described herein, but also other embodiments that may come to mind in accordance with these principles. The scope of the present invention is intended to cover all such embodiments that may fall within the scope of the appended claims, either literally or under the doctrine of equivalents.

Figure 2:
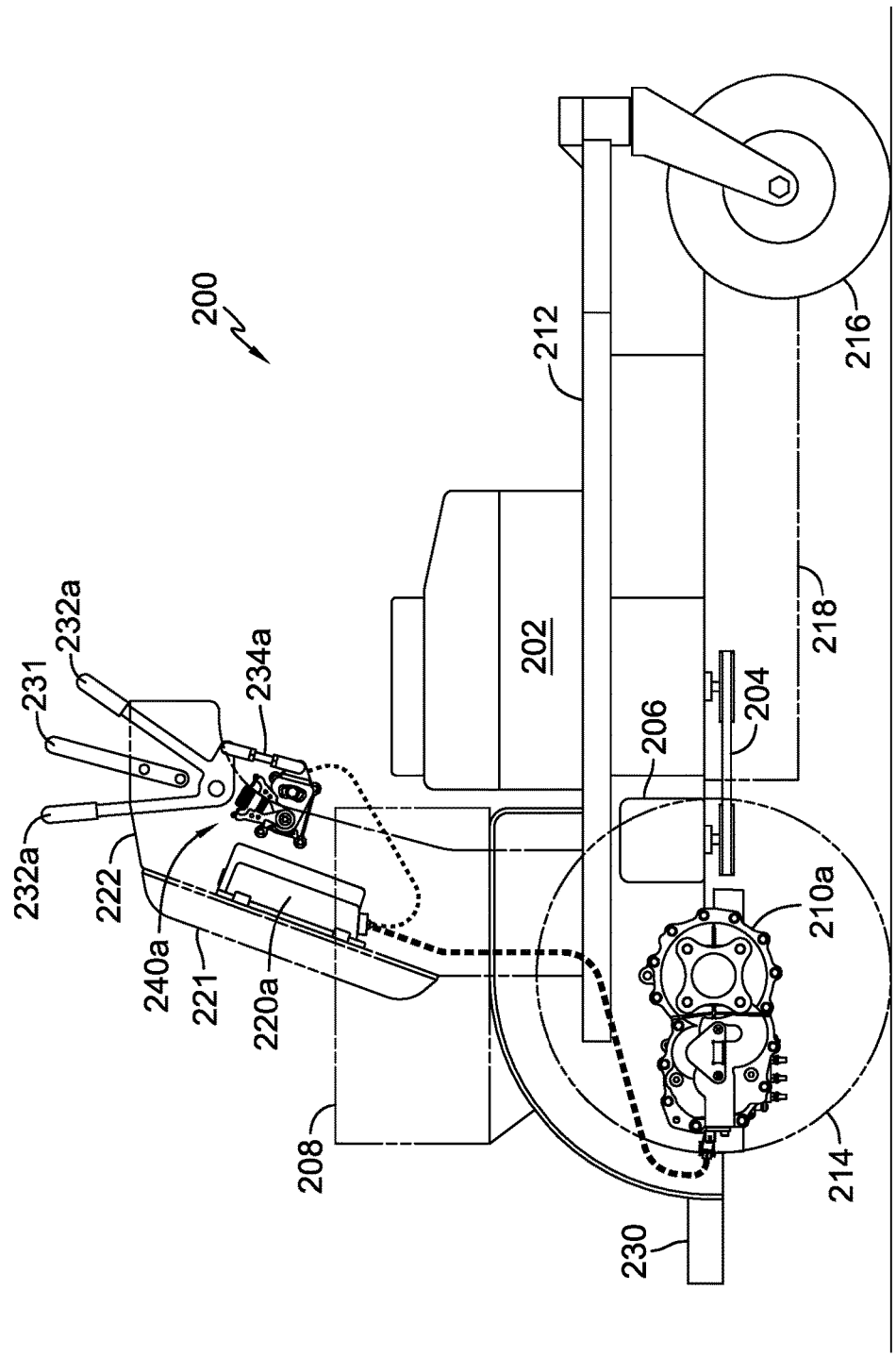
FIG. 2 is a side elevational view of an exemplary zero turn hybrid utility vehicle.
Figure 3:
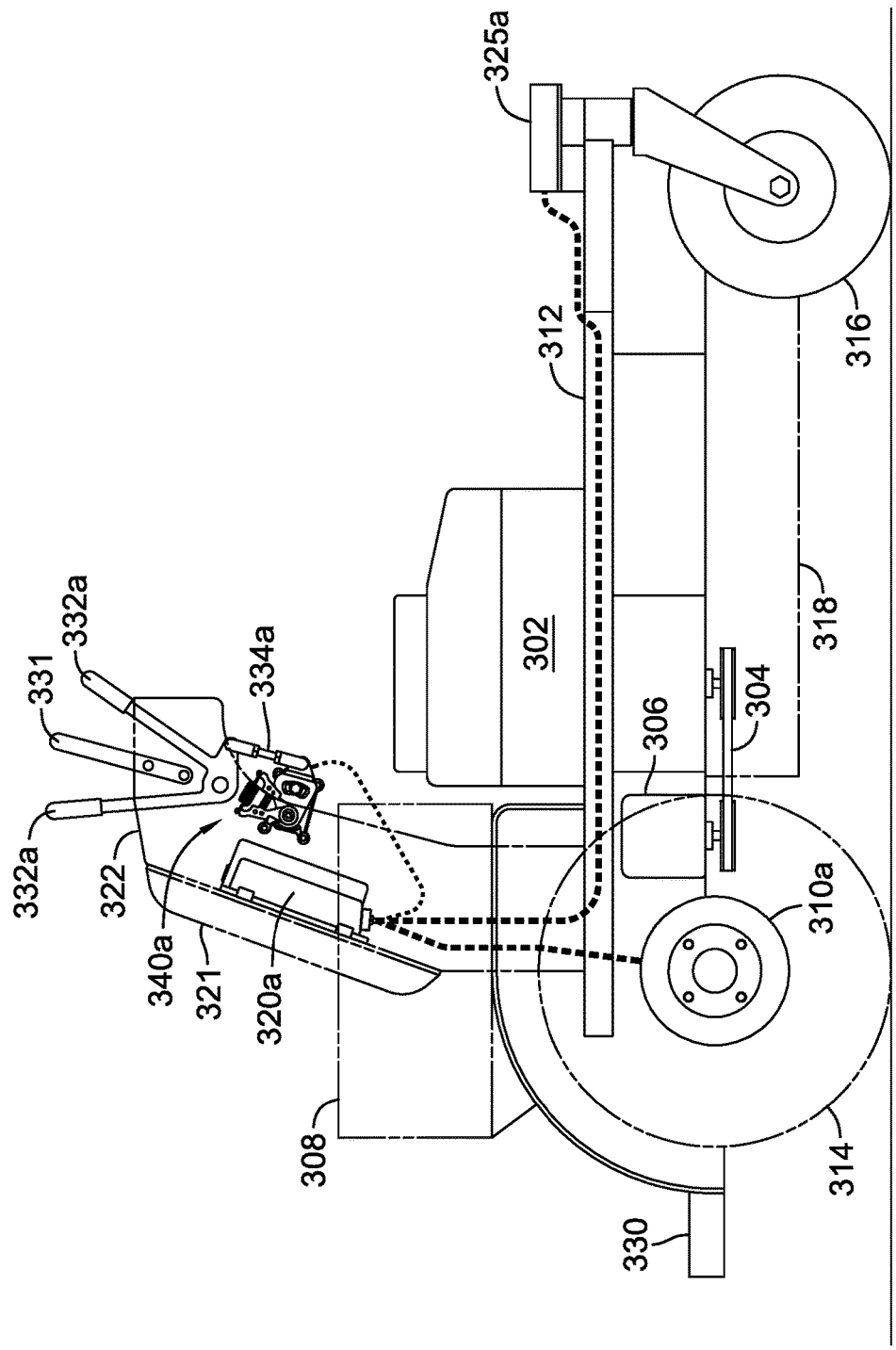
FIG. 3 is a side elevational view of another exemplary zero turn hybrid utility vehicle.
Figure 4:
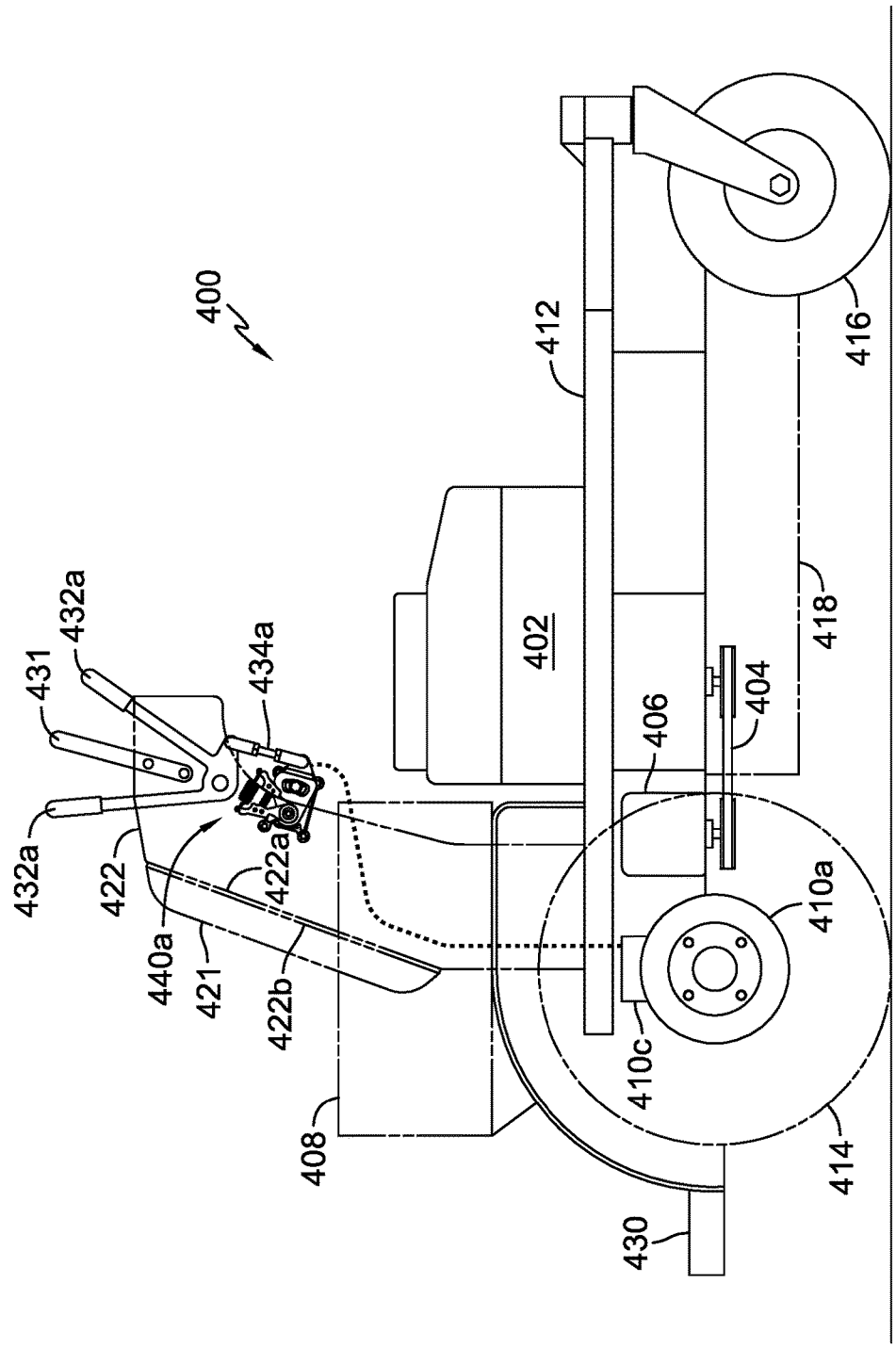
FIG. 4 is a side elevational view of another exemplary zero turn hybrid utility vehicle.

It should be noted that in the description and drawings, like or substantially similar elements may be labeled with the same reference numerals. However, sometimes these elements may be labeled with differing or serial numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. Furthermore, certain views, e.g., FIGS. 2, 3 and 4, are side views which depict only one side of the vehicle, but it will be understood that the opposite side is preferably identical thereto in many respects. The present specification is intended to be taken as a whole and interpreted in accordance with the principles of the present invention as taught herein and understood by one of ordinary skill in the art.

Figure 1:
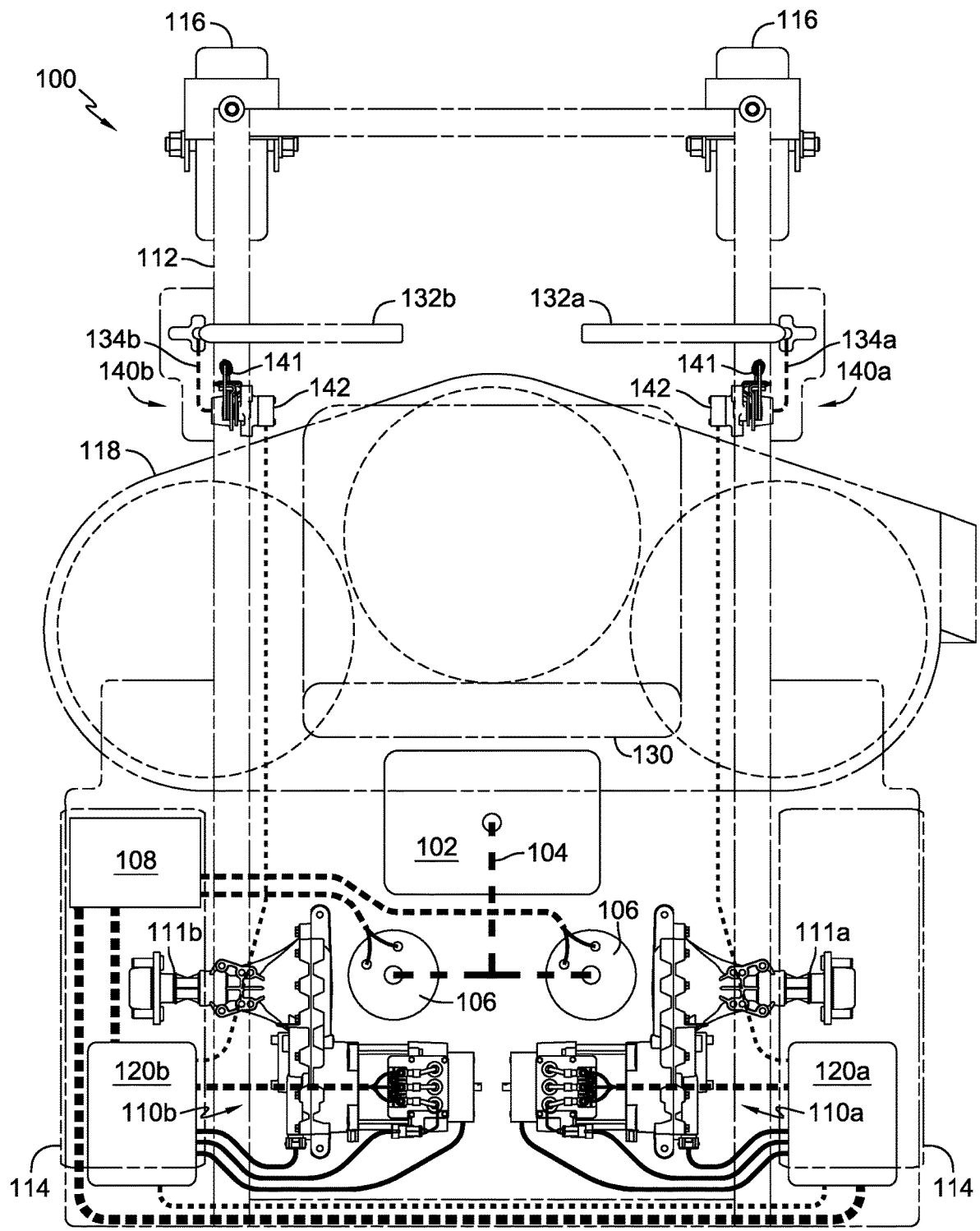
FIG. 1 is a top plan view of a zero turn hybrid utility vehicle.

FIG. 1 depicts an embodiment of a zero turn hybrid utility vehicle 100, which by way of example only is a riding utility vehicle. Various components of vehicle 100 can be mounted on and supported by a frame 112. In particular, an engine 102, one or two alternators 106 (two shown), battery 108, electric zero turn transaxles 110a, 110b, and traction controllers 120a, 120b can be mounted on frame 112. Frame 112 also supports a deck 118, which may be of fixed height (relative to ground), ground-following, or height adjustable as known in the art. Deck 118 can include mowing blades and is intended to be representative of other ground engaging equipment such as brush cutters, aerators, and the like. Such implements are preferably operatively engaged to and driven by the engine 102 by known means, such as a belt and pulley system, which is not shown here for clarity. The other embodiments disclosed herein are similar in terms of the deck and related implements. Operator seat 130, situated by way of example only above deck 118, is also affixed to frame 112. Frame 112 is supported above ground by a pair of caster wheels 116 and a pair of driven wheels 114.

Figure 6:
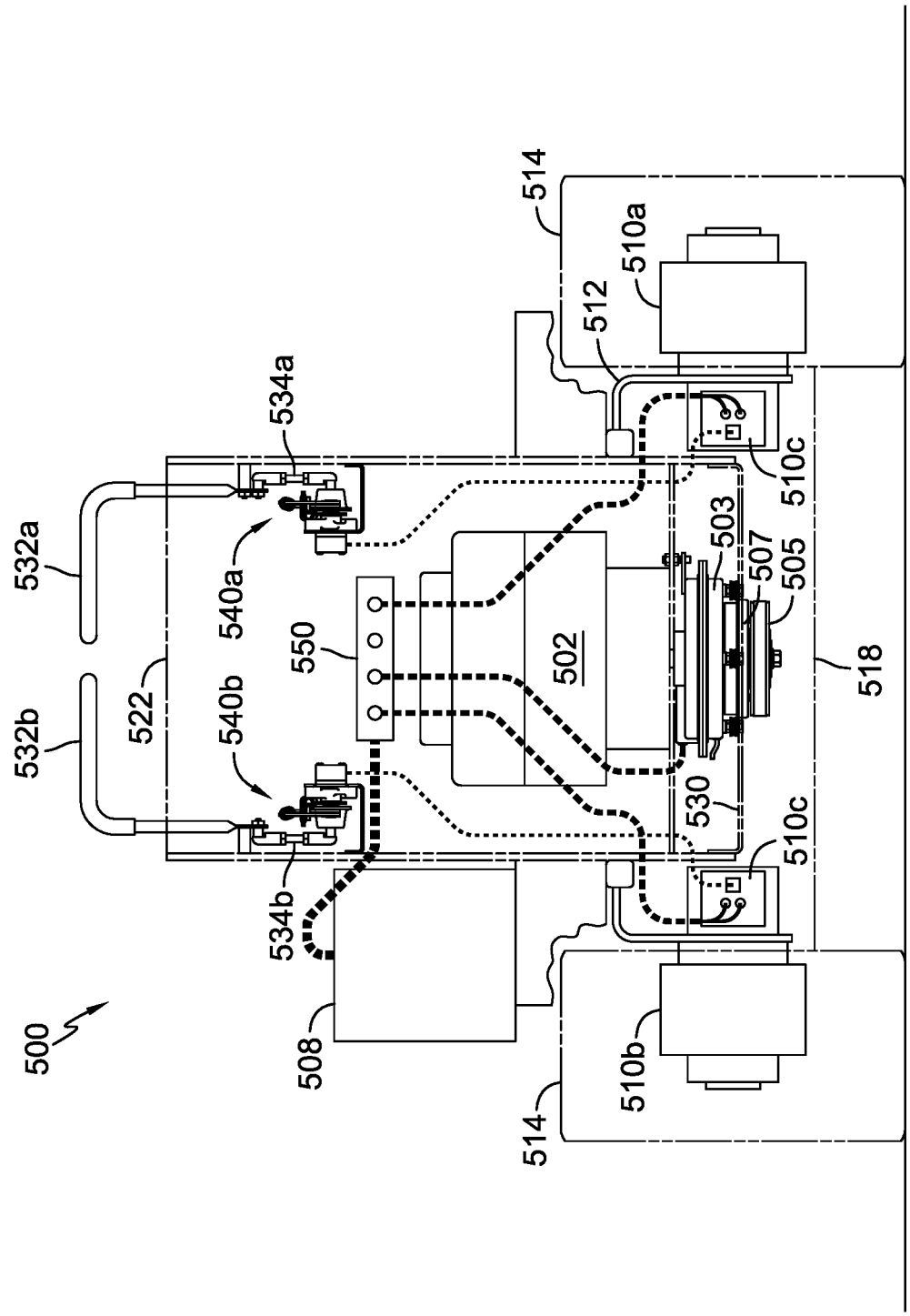
FIG. 6 is a rear elevational view of another exemplary zero turn hybrid utility vehicle.

Engine 102, such as an internal combustion engine, drives alternators 106 via a belt and pulley assembly 104. Alternators 106 generate electric power to charge a battery 108, and it will be understood that the alternators could be replaced with one or more generators such as is shown in the embodiment of FIG. 6. Battery 108 supplies electric power to electric zero turn transaxles 110a, 110b. Electric zero turn transaxles 110a, 110b provide rotational output through a pair of output shafts 111a, 111b to rotationally drive a pair of driven wheels 114.

Traction controllers 120a, 120b can control the speed and direction of wheels 114 by controlling the respective electric zero turn transaxles 110a, 110b, based on inputs from an operator (sitting in operator seat 130). Traction controllers 120a, 120b are mounted near the rear of vehicle 100 near transaxles 110a, 110b away from engine 120 to aid in cooling, although other locations are possible. The operator can provide speed and direction inputs through a pair of drive levers 132a, 132b. Drive levers 132a, 132b can connect to a pair of control assemblies 140a, 140b via mechanical linkages 134a, 134b. Control assemblies 140a, 140b can each include a mechanical return to neutral ("RTN") mechanism 141 and a potentiometer 142 to communicate the position of drive levers 132a and 132b to traction controllers 120a and 120b, respectively. Based on the position of drive levers 132a, 132b, potentiometers 142 can provide varying inputs to traction controllers 120a, 120b so that electric zero turn transaxles 110a, 110b (and wheels 114) are driven as desired by the operator. In the absence of inputs from the operator, RTN mechanisms 141 can force the drive levers 132*a*, 132*b* to a neutral position. Front caster wheels 116 react in response to the actions of rear driven wheels 114.

FIG. 2 depicts a side view of an embodiment of a zero turn hybrid utility vehicle 200 similar to vehicle 100, but differing in that the vehicle 200 is a stand-on utility vehicle. The various components of vehicle 200 can be mounted on and supported by a frame 212. In this side view of FIG. 2, only one side is shown so certain components are duplicated on the other side of the vehicle, and it will be understood that these components are preferably identical to the ones depicted. Reference is made to the embodiments of FIGS. 5 and 6 for clarity on this point. Engine 202, alternator(s) 206, battery 208, electric zero turn transaxles 210*a* and 210*b* (not shown), and traction controllers 220*a* and 220*b* (not shown) can be mounted on vehicle 200 and can operate similarly to the description of the first embodiment. Engine 202, such as an internal combustion engine, drives alternator(s) 206 via a belt and pulley assembly 204. Frame 212 also supports a deck 218, which can include mowing blades and is intended to be representative of other ground engaging equipment such as brush cutters, aerators, and the like, and, as mentioned, such implements would be powered by engine 202 by known means. Frame 212 is supported above ground by a pair of front caster wheels 216 and a pair of rear driven wheels 214. Front caster wheels 216 react in response to the actions of the rear driven wheels 214.

An operator can stand on a platform 230, disposed at the rear of vehicle 200. An upright riser 222 is attached to frame 212 and can include an operator cushion 221 for the operator to lean against during operation. Drive levers 232*a* and 232*b* (not shown) can be mounted on upright riser 222 and can be manipulated by the operator to provide speed and direction inputs via linkages 234*a* and 234*b* (not shown) connected to control assemblies 240*a* and 240*b* (not shown), respectively. Control assemblies 240*a*, 240*b* are preferably consistent in design with control assemblies 140*a*, 140*b* described above and will not be described in detail here. The potentiometers of control assemblies 240*a*, 240*b* are wired to their respective traction controllers 220*a*, 220*b*.

Drive levers 232*a*, 232*b* can include multiple graspable components to allow the operator to more conveniently manipulate the drive levers 232*a*, 232*b*. Stationary handle 231 is also mounted on upright riser 222 and is disposed between components of drive levers 232*a*, 232*b*, and can be grasped to provide stability to the operator when operating vehicle 200. Vehicle 200 also differs from vehicle 100 in that traction controllers 220*a* and 220*b* (not shown) are positioned on upright riser 222 and are thus disposed above vehicle frame 212 at an elevated position near drive levers 232*a*, 232*b*. As depicted, operator cushion 221 is mounted on a rear surface of upright riser 222 and traction controllers 220*a* and 220*b* are mounted on a front surface of upright riser 222, opposite to the rear surface. Placement of traction controllers 220*a* and 220*b* on the upright riser 222 behind the operator cushion 221 provides a particularly compact design.

FIG. 3 depicts a further embodiment of a zero turn hybrid utility vehicle 300 similar to vehicle 200, but differing in the steering of vehicle 300 by using electric wheel hub motors in place of the electric transaxles of vehicle 200, and using electric actuators as described below. Again, as a side view, certain components are not shown but will preferably be identical to the ones depicted, and reference is made to the embodiment of FIGS. 5 and 6 for clarity on this point. Engine 302, alternators 306, battery 308, electric wheel motors 310*a* and 310*b* (not shown), and traction controllers 320*a*, 320*b* (not shown) can be mounted on vehicle 300, and frame 312 also includes an upright riser 322. Engine 302, such as an internal combustion engine, drives alternators 306 via a belt and pulley assembly 304. Traction controllers 320*a* and 320*b* (not shown) control the speed and direction of electric wheel motors 310*a* and 310*b* (not shown) that drive driven wheels 314, based on operator manipulation of drive levers 332*a* and 332*b* (not shown). Control assemblies 340*a*, 340*b* (not shown) are preferably consistent in design with control assemblies 140*a*, 140*b* described above and will not be described in detail here. The potentiometers of control assemblies 340*a*, 340*b* are wired to their respective traction controllers 320*a*, 320*b*.

Traction controllers 320*a*, 320*b* can coordinate the positioning of electric actuators 325*a*, 325*b* (not shown) with the speed and direction of electric wheel motors 310*a*, 310*b* to improve the overall steering of vehicle 300. As in the prior embodiment, placement of traction controllers 320*a* and 320*b* on upright riser 322 behind the operator cushion 321 provides a particularly compact design. Steering control is added to front caster wheels 316 by means of electric actuators 325*a* and 325*b*. Front caster wheels 316 are therefore more responsive to the actions of the operator as transmitted through traction controllers 320*a* and 320*b*. That is, wheels 316 follow the intended direction of vehicle 300 in a coordinated manner rather than pivoting freely in response to variations in terrain. This can provide better vehicle response to operator inputs and therefore provides the operator with better control of vehicle 300, particularly when traversing slopes or traveling over rough terrain.

Figure 5:
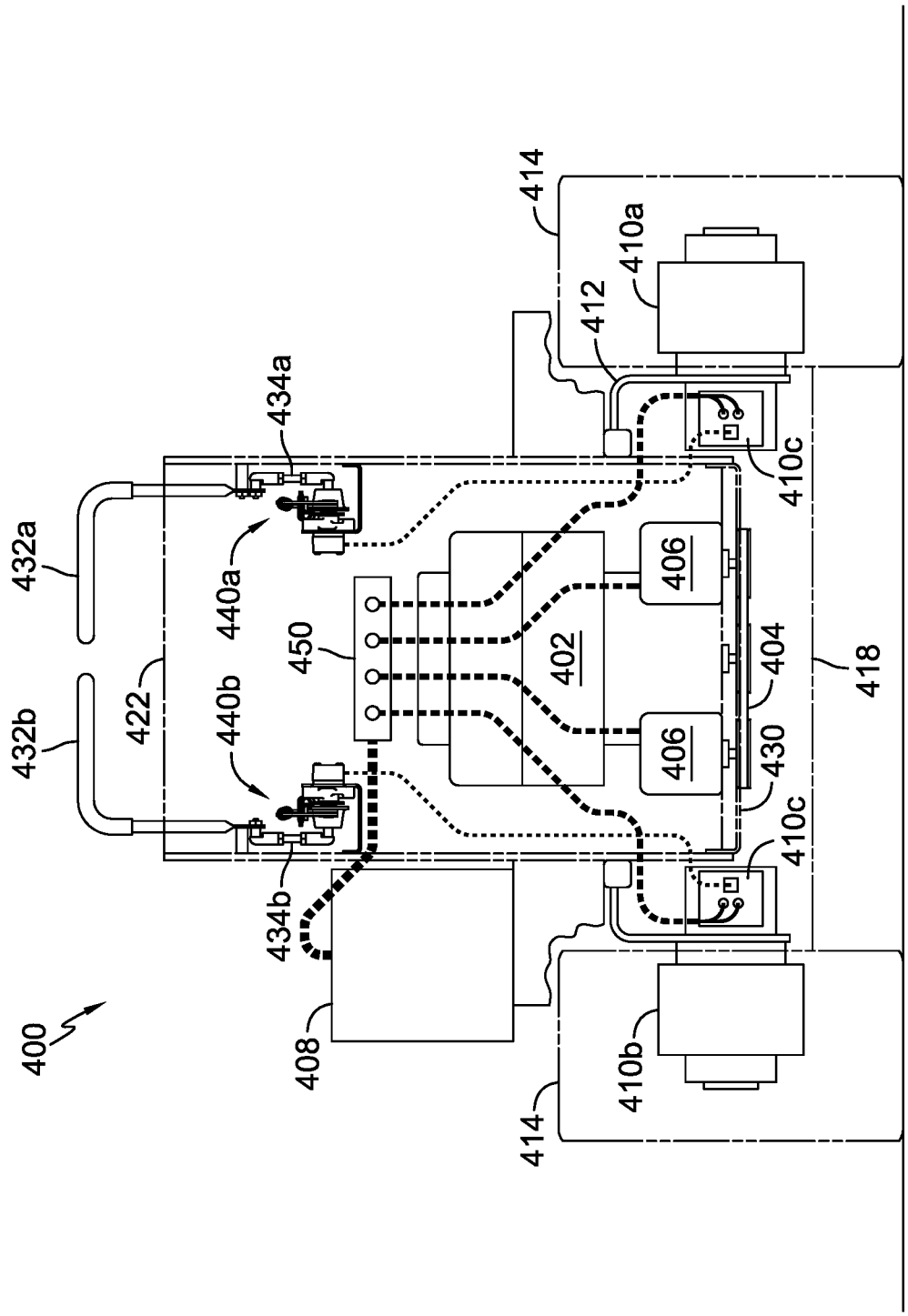
FIG. 5 is a rear elevational view of the vehicle of FIG. 4.

FIGS. 4 and 5 depict an embodiment of a zero turn hybrid utility vehicle 400 similar to vehicles 200 and 300, but differing in the control of the electric wheel motors and the caster wheels. Certain components discussed herein are not depicted in both FIGS. 4 and 5 simply for clarity. For example, the operator cushion 421 located on the rear surface 422*a* of riser 422 is not shown in the rear view of FIG. 5, and riser 422 is shown only in phantom outline format, to permit one to see other components such as bus 450, that would otherwise be hidden.

In this embodiment, engine 402, alternators 406, battery 408, and electric wheel motors 410*a* and 410*b* can be mounted on vehicle 400. As in the prior embodiments, an operator can stand on a platform 430, disposed at the rear of vehicle 400. Upright riser 422 attached to frame 412 can include an operator cushion 421 for the operator to lean against during operation. Drive levers 432*a* and 432*b* can be mounted on upright riser 422 and can be structurally and operationally similar to those previously described, including connection via linkages 434*a* and 434*b* connected to control assemblies 440*a* and 440*b*, respectively.

The speed and direction of electric wheel motors 410*a* and 410*b*, and ultimately driven wheels 414, are controlled by controllers 410*c* that are integrated with the electric wheel motors 410*a*, 410*b*. Integrated controllers 410*c* receive inputs from the operator through drive levers 432*a* and 432*b* via control assemblies 440*a* and 440*b*, which may be similar to those discussed above and may also include a return to neutral mechanism. The potentiometers of control assemblies 440*a*, 440*b* are wired to their respective integrated controllers 410*c*. Note that FIGS. 4 and 5 depict different optional locations for integrated controllers 410*c*. A bus 450 for connecting the various conductors depicted may be mounted on the front surface 422*b* of upright riser 422, as shown in FIG. 5, with operator cushion 421 mounted on a rear surface 422*a* opposite thereto. As shown, electrical bus 450 is connected to battery 408, alternators 406 and integrated controllers 410c. Electrical bus 450 provides power distribution. Again, components such as operator cushion 421 are not shown in FIG. 5 in order to improve clarity and understanding. Front caster wheels 416 react in response to the actions of rear driven wheels 414, as in the manner described for vehicle 200. If desired, electric actuators similar to actuators 325a, 325b described above could be used in this embodiment and receive power from electrical bus 450. However, additional integrated controllers in the electric actuators or separate controller(s) would be needed to process input signals from the operator to provide additional front steering via electric actuators in this embodiment.

FIG. 6 depicts an embodiment of a zero turn vehicle 500 that is similar in many respects to the vehicle 400 described above. In this embodiment, deck 518, engine 502, battery 508, electric wheel motors 510a and 510b can be mounted on vehicle 500. As in frame 412 of vehicle 400, frame 512 is also depicted as including brackets for mounting the wheel motors 510a, 510b. Frame 512 also includes an upright riser 522 on which electrical bus 550, drive levers 532a and 532b and control assemblies 540a and 540b would be mounted. It will be understood that an operator cushion similar to cushion 421 would be used here, but is not shown in FIG. 6 for clarity. In this embodiment, engine 502 drives a generator 503 which is connected to a clutch-brake 507 and belt and pulley assembly 505 which drives the cutting blades (not shown) of mowing deck 518. Electrical bus 550 is used to provide power connections between the generator 503, wheel motors 510a, 510b and battery 508. The internal construction of generator 503 and clutch-brake 507 can be similar to that disclosed in U.S. Application No. 62/058,577, the terms of which are incorporated herein by reference, and which is now disclosed in U.S. Pat. No. 9,866,088.

As in the prior embodiment, an operator can stand on a platform 530, disposed at the rear of vehicle 500. Drive levers 532a and 532b mounted on upright riser 522 can be structurally and operationally similar to those previously described, including connection via linkages 534a and 534b connected to control assemblies 540a and 540b, respectively. The potentiometers of control assemblies 540a, 540b are wired to their respective integrated controllers 510c. The speed and direction of electric wheel motors 510a and 510b, and ultimately driven wheels 514, are controlled by the integrated controllers 510c.

While specific embodiments of the invention have been described in detail, it will be appreciated by those skilled in the art that various modifications and alternatives to those details could be developed in light of the overall teachings of the disclosure. Accordingly, the particular arrangements disclosed is meant to be illustrative only and not limiting as to the scope of the invention which is to be given the full breadth of the appended claims and any equivalent thereof.

What is claimed is:

1. A vehicle, comprising:
   a first driven wheel and a second driven wheel, both disposed adjacent to a frame;
   an operator platform disposed on the frame adjacent to a rear of the frame, configured to permit an operator to stand on the vehicle during operation of the vehicle;
   an upright riser disposed on the frame and having a surface providing a support portion for the operator;
   an electric power source disposed on the vehicle;
   a drive control mechanism for controlling speed and direction of the vehicle, the drive control mechanism comprising a plurality of drive levers disposed on the upright riser, at least one return to neutral mechanism disposed on the upright riser and at least one linkage connecting the at least one return to neutral mechanism to at least one lever of the plurality of drive levers, wherein the at least one return to neutral mechanism, and the at least one linkage cooperate to provide a return-to-neutral force to the at least one lever when the at least one lever is in a non-neutral drive position;
   at least one traction controller disposed on the vehicle and in communication with the drive control mechanism;
   a pair of electric drives disposed on the vehicle and connected to and controlled by the at least one traction controller, wherein both of the pair of electric drives are connected to and drive one of the first driven wheel and the second driven wheel.

2. The vehicle of claim 1, wherein the at least one traction controller comprises a pair of traction controllers, each of the pair of traction controllers being located on one of the pair of electric drives.

3. The vehicle of claim 1, wherein the pair of electric drives comprises a first electric transaxle engaged to and driving the first driven wheel and a second electric transaxle engaged to and driving the second driven wheel.

4. The vehicle of claim 3, wherein the at least one traction controller comprises a first traction controller located on the first electric transaxle and a second traction controller located on the second electric transaxle.

5. The vehicle of claim 4, wherein the first traction controller is integrated with the first electric transaxle and the second traction controller is integrated with the second electric transaxle.

6. The vehicle of claim 1, wherein the pair of electric drives comprises a first electric wheel motor engaged to and driving the first driven wheel and a second electric wheel motor engaged to and driving the second driven wheel.

7. The vehicle of claim 6, wherein the at least one traction controller comprises a first traction controller located on the first electric wheel motor and a second traction controller located on the second electric wheel motor.

8. The vehicle of claim 7, wherein the first traction controller is integrated with the first electric wheel motor and the second traction controller is integrated with the second electric wheel motor.

9. The vehicle of claim 8, further comprising an electrical bus disposed on the upright riser, wherein the first traction controller, the second traction controller, and the plurality of drive levers are connected to the electrical bus.

10. A vehicle, comprising:
    a first driven wheel disposed adjacent a rear of a frame and a second driven wheel disposed adjacent the rear of the frame;
    an operator platform disposed on the frame adjacent to the rear thereof, the operator platform configured to permit an operator to stand on the vehicle during operation of the vehicle;
    an electric power source disposed on the vehicle;
    a pair of drive levers for controlling speed and direction of the vehicle;
    at least one traction controller disposed on the vehicle and in communication with the pair of drive levers;
    a pair of electric drives disposed on the vehicle, each of the pair of electric drives being connected to and controlled by the at least one traction controller, each of the pair of electric drives connected to and driving one of the first driven wheel and the second driven wheel;
    an upright riser disposed on the frame and having a rear surface providing a support portion for the operator, and a front surface opposite to the rear surface, wherein the pair of drive levers are disposed on the upright riser; and a pair of control assemblies disposed on the upright riser, each of the pair of control assemblies comprising a separate return to neutral mechanism engaged to one of the pair of drive levers by a separate linkage.

11. The vehicle of claim 10, wherein the at least one traction controller comprises a pair of traction controllers and the separate position sensor of each of the pair of control assemblies is wired to one of the pair of traction controllers.

12. The vehicle of claim 10, wherein the pair of electric drives comprises a first electric wheel motor engaged to and driving the first driven wheel and a second electric wheel motor engaged to and driving the second driven wheel.

13. The vehicle of claim 10, wherein the pair of electric drives comprises a first electric transaxle engaged to and driving the first driven wheel and a second electric transaxle engaged to and driving the second driven wheel.

* * * * *